(12) United States Patent
Kawasaki et al.

(10) Patent No.: US 6,513,494 B2
(45) Date of Patent: Feb. 4, 2003

(54) SYSTEM AND METHOD OF CONTROLLING IGNITION TIMING IN AN ENGINE WITH A VARIABLY OPERATED INTAKE VALVE (75) Inventors: Takao Kawasaki, Kanagawa (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/725,710

(22) Filed: Nov. 30, 2000

(65) Prior Publication Data

US 2001/0006058 A1 Jul. 5, 2001

(30) Foreign Application Priority Data

Dec. 1, 1999 (JP) ............................................ 11-342501

(51) Int. Cl.$^7$ ................................................. F02P 5/00
(52) U.S. Cl. ............................ 123/406.12; 123/90.15
(58) Field of Search ......................... 123/348, 406.45, 123/406.46, 339.11, 347, 90.15, 406.12

(56) References Cited

U.S. PATENT DOCUMENTS

| 4,503,822 A | * | 3/1985 | Kobayashi et al. ......... 123/416 |
| 4,700,684 A | | 10/1987 | Pischinger et al. ......... 123/568 |
| 5,947,079 A | * | 9/1999 | Sivashankar et al. ....... 123/295 |
| 5,996,560 A | | 12/1999 | Schechter .................... 123/556 |
| 6,039,026 A | | 3/2000 | Shiraishi et al. |

FOREIGN PATENT DOCUMENTS

| DE | 198 47 851 A1 | 4/1999 |
| EP | 0 953 750 | 11/1999 |
| JP | 5-071370 | 3/1993 |
| JP | 8-200025 | 8/1996 |
| JP | 10-037727 | 2/1998 |

OTHER PUBLICATIONS

Patent Abstracts of Japan, vol. 017, No. 584 (M–1501), Oct. 25, 1993 (Oct. 25, 1993), JP 05–171991.
Patent Abstracts of Japan, vol. 1997, No. 12, Dec. 25, 1997 (Dec. 25, 1997), JP 09–209895.
S. Hara et al., "Effects of Intake–Valve Closing Timing on Spark–Ignition Engine Combustion", SAE Paper 850074, May 4, 1986, pp. 1.396–1.405.

* cited by examiner

Primary Examiner—Willis R. Wolfe
Assistant Examiner—Johnny H. Hoang
(74) Attorney, Agent, or Firm—Foley & Lardner (57) ABSTRACT A system and method of optimally controlling ignition timings in an engine conditioned in first and second modes of intake control. A control unit includes an unthrottled operation control conducting the first mode by varying a closing timing of an intake valve and fixing a throttle position of a throttle valve, a throttled operation control conducting the second mode by varying the throttle position of the throttle valve and fixing the closing timing of the intake valve, and an ignition timing control determining different ignition timings to be used in the first and second modes.

69 Claims, 7 Drawing Sheets

SYSTEM AND METHOD OF CONTROLLING IGNITION TIMING IN AN ENGINE WITH A VARIABLY OPERATED INTAKE VALVE

FIELD OF THE INVENTION

The present invention relates to an apparatus and method of controlling ignition timing in an engine with a variably operated intake valve.

BACKGROUND OF THE INVENTION

There have been proposed apparatuses for controlling intake and exhaust valves using a variably operated valve actuator, for instance, an electromagnetically operated valve actuators. The apparatuses of such the kind are disclosed in Japanese Patent Applications First Publications Nos. 8-200025 and 10-37727.

In addition, recently, there has been developed unthrottled engine operation in which an intake air amount is regulated without actuation of a throttle valve by operating an intake valve at an early closing timing at an engine intake stroke, for the purpose of reduction in engine pumping loss and, therefore, improvement in fuel economy. In this case, the throttle valve is omitted or suplementally disposed within an intake air passage in order to produce a slight negative pressure therewithin.

SUMMARY OF THE INVENTION

However, in some engine operating conditions, it is desirable to control the intake air amount by fixing the closing timing of the intake valve to near bottom dead center (BDC) at the engine intake stroke and varying a throttle position corresponding to an opening degree of the throttle valve. Therefore, there is a demand to conduct the intake air amount control by separately controlling the intake valve and the throttle valve.

Assuming that the intake air amount is controlled by variably controlling the intake valve in the separate controls of the intake valve and the throttle valve, the closing timing of the intake valve becomes early, i.e., advanced to reduce the opening duration in order to lessen the intake air amount at low load. This prevents a flow rate of the intake air at an intake port from sufficiently increasing, to thereby attenuate a gas flow within the engine cylinder. Further, the temperature of an air-fuel mixture within the engine cylinder is decreased due to adiabatic expansion caused after the early closure of the intake valve. This causes combustion speed of the air-fuel mixture to be lower than combustion speed thereof in the case of controlling the throttle valve. In addition, there is a difference between the negative pressures within the intake air passage which are generated upon the respective controls of the intake valve and the throttle valve. The negative pressure difference also greatly influences the combustion speed of the air-fuel mixture.

Therefore, if the same ignition timings are used in the different intake control modes in which the intake air amounts are controlled by the separate controls of the intake valve and the throttle valve, there will occur considerable influence on drivability and fuel economy.

It is an object of the present invention to provide a system and method of optimally controlling ignition timing in an engine conditioned in different intake control modes, to thereby improve in performance such as drivability and fuel economy.

According to one aspect of the present invention, there is provided a system for controlling ignition timing in an engine, the system comprising:

an intake valve operative at variable opening and closing timing to regulate an amount of intake air passing therethrough;

a throttle valve operative to variably move between throttle positions to regulate an amount of intake air passing therethrough;

an unthrottled operation control in communication with the intake valve and the throttle valve, the unthrottled operation control performing a first intake control mode in which an intake air amount is controlled by varying. the closing timing of the intake valve, and generating a first mode output indicative of the first intake control mode and providing a control output indicative of the varied closing timing to the intake valve;

a throttled operation control in communication with the intake valve and the throttle valve, the throttled operation control performing a second intake control mode in which the intake air amount is controlled by varying the throttle position of the throttle valve, and generating a second mode output indicative of the second intake control mode and providing a control output indicative of the varied throttle position to the throttle valve; and an ignition timing control in communication with the unthrottled operation and throttled operation controls, the ignition timing control being operative to determine a first ignition timing in response to the first mode output and determine a second ignition timing different from the first ignition timing in response to the second mode output.

According to a further aspect of the present invention, there is provided a method of controlling ignition timing in an engine having a variably operated intake valve cooperating with a variably operated throttle valve, the method comprising:

determining an engine operating condition;

depending on the engine operating condition determined, selectively conducting one of an unthrottled operation control in which an intake air amount is controlled by varying a closing timing of the intake valve, and a throttled operation control in which the intake air amount is controlled by varying the throttle position of the throttle valve; and determining an ignition timing to be used in the conducted one of the unthrottled operation and throttled operation controls, the ignition timing comprising first and second ignition timings different from each other.

According to a still further aspect of the present invention, there is provided a computer readable storage device having stored therein data representing instructions executable by a computer to control an engine having a variably operated intake valve cooperating with a variably operated throttle valve, the computer readable storage device comprising:

instructions for determining an engine operating condition;

instructions for depending on the engine operating condition determined, selectively conducting one of an unthrottled operation control in which an intake air amount is controlled by fixing-a throttle position of the throttle valve to a predetermined throttle position and varying a closing timing of the intake valve, and a throttled operation control in which the intake air amount is controlled by fixing the closing timing of the intake valve to a predetermined closing timing and varying the throttle position of the throttle valve; and instructions for determining an ignition timing to be used in the conducted one of the unthrottled operation and throttled operation controls, the ignition timing comprising first and second ignition timings different from each other.

DESCRIPTION OF THE PREFERRED EMBODIMENT

Figure 2A:
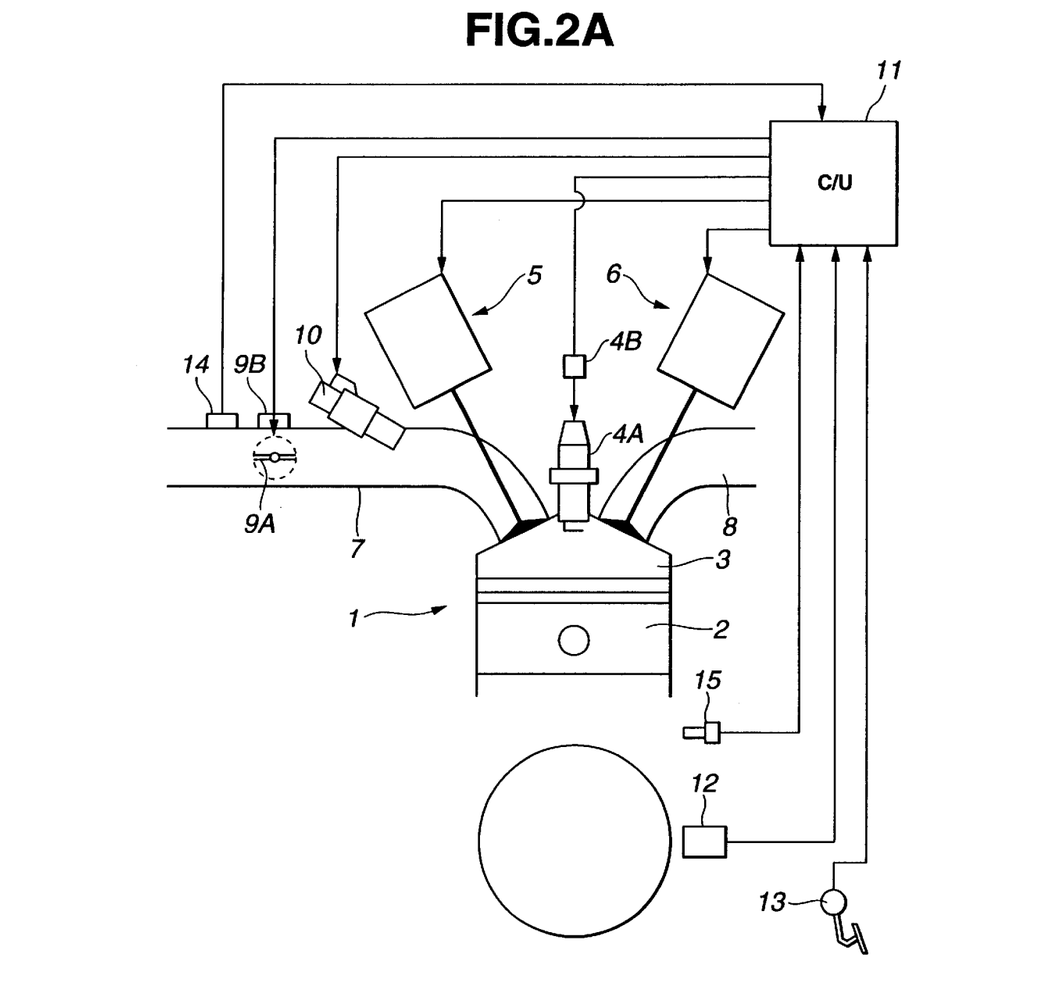
FIG. 2A is a schematic diagram of an engine system in which the principles of the present invention are carried out in accordance with the embodiments.
Figure 2B:
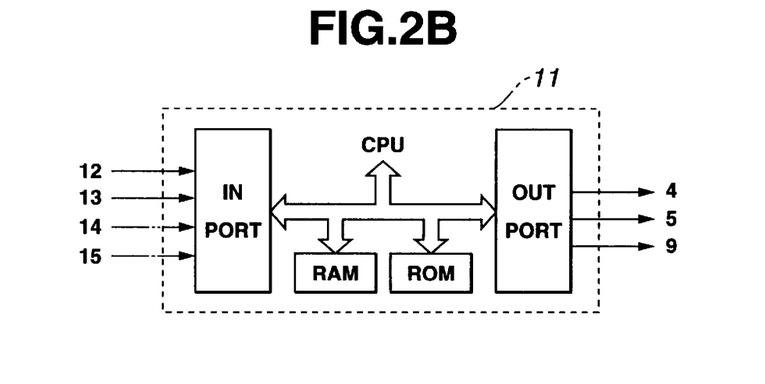
FIG. 2B illustrates a block diagram of a control unit used in the system of FIG. 2A.

Referring now to FIG. 2A, there is shown an engine system including engine 1 having piston 2 which defines combustion chamber 3 within an engine cylinder of engine 1. Piston 2 is provided in each of engine cylinders of engine 1. Spark plug 4A is mounted to combustion chamber 3 and operative to be actuated by ignition actuator 4B including ignition coil. Disposed around spark plug 4A are intake valve and exhaust valve 6 which are of an electromagnetically operated type as explained later. Intake pipe 7 and exhaust pipe 8 are connected with combustion chamber 3 of engine 1. Electronically controlled throttle valve 9A driven by throttle actuator 9B such as a motor is mounted to the collecting portion of intake pipe 7 which is commonly connected with the engine cylinders. Electro-magnetically operated fuel injector valve 10 is mounted to the intake port of intake pipe 7 which is provided corresponding to each engine cylinder. Intake and exhaust valves 5 and 6, throttle valve 9A, fuel injector valve 10 and spark plug 4A are electrically connected with control unit 11 and operated thereby. Connected with control unit 11 is crank angle sensor 12 detecting a crank angle in synchronous relation to engine revolution and generating a crank angle signal indicative of the detected crank angle and therefore engine speed signal Ne indicative of the engine speed, i.e., the number of engine revolution. Also, connected with control unit 11 is accelerator sensor 13 detecting an accelerator position corresponding to an opening degree or depression amount of an accelerator and generating accelerator signal APO indicative of the detected accelerator position. Accelerator sensor 13 may be an idle switch that shifts to ON state when the accelerator is in the accelerator full-closed position. Airflow meter 14 is disposed upstream of throttle valve 9A within intake pipe 7 and connected with control unit 11. Airflow meter 14 detects an amount of intake air and generates intake air amount signal Qa indicative of the detected amount of intake air. Coolant temperature sensor 15 is connected with control unit 11, which detects a temperature of an engine coolant and generates a coolant temperature signal Tw indicative of the detected temperature of the engine coolant. Control unit 11 may be formed by a microcomputer, for example, including a central processing unit (CPU), input ports (IN PORT), output ports (OUT PORT), read-only memory (ROM), random access memory (RAM) and a common data bus as shown in FIG. 2B. Control unit 11 receives the signals generated from the sensors and processes the signals to determine an engine operating condition. Depending on the engine operating condition, control unit 11 selectively performs one of first and second intake control modes, in which an intake air amount is regulated by separately controlling the opening and closing timings of intake valve 5 and the throttle position of throttle valve 9A as explained later. Control unit 11 determines first and second ignition timings different from each other, which are to be used in the first and second intake control modes. Control unit 11 provides control outputs for controlling intake valve 5 at the opening and closing timings and controlling throttle valve 9A at the throttle position through throttle actuator 9B in the respective intake control modes. Control unit 11 also provides a control output for controlling spark plug 4A through ignition actuator 4B at the determined ignition timings.

Figure 3:
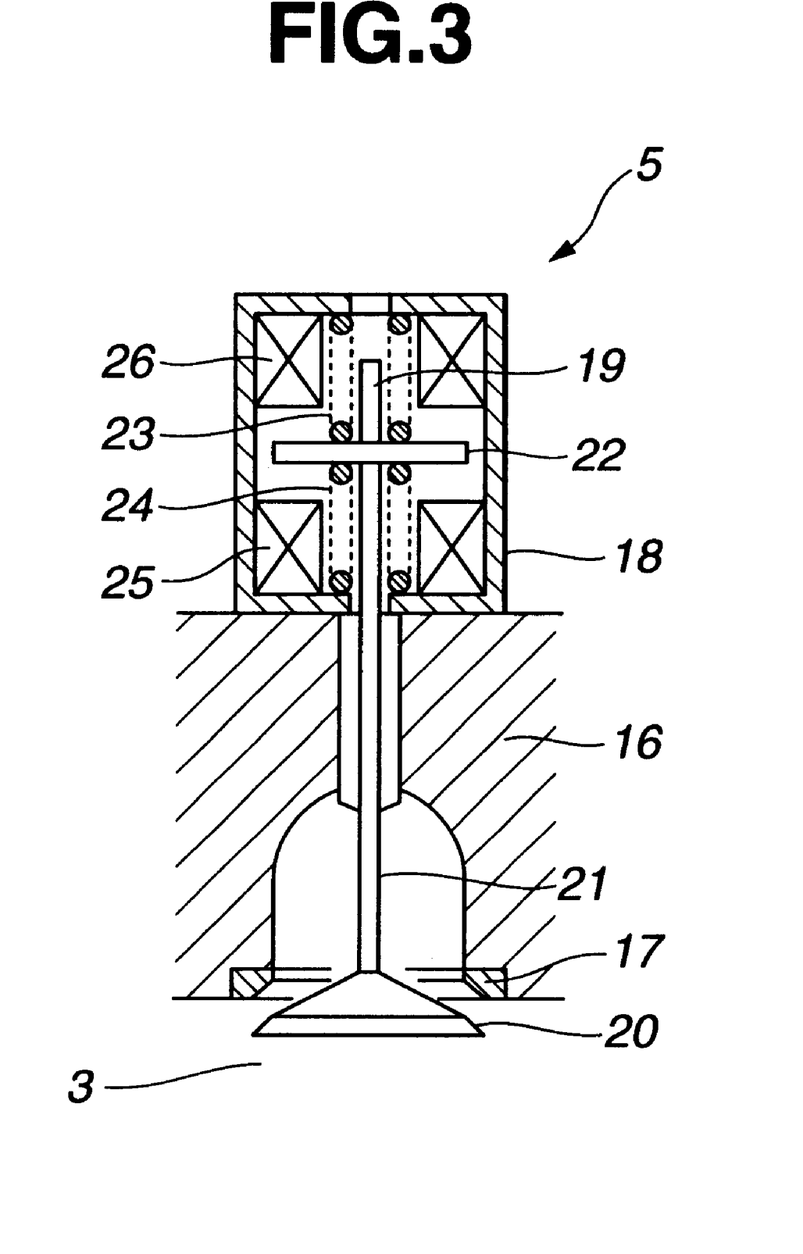
FIG. 3 is a diagram of an electromagnetically operated engine valve.

Referring to FIG. 3, a basic structure of electromagnetically operated intake valve 5 is explained. Electromagnetically operated exhaust valve 6 also has a basic structure similar to the structure of intake valve 5.

As illustrated in FIG. 3, electromagnetically operated intake valve 5 is mounted to cylinder head 16. Intake valve 5 has a closed position, a full open position, and a mid-open position therebetween shown in FIG. 3. Intake valve 5 includes valve body 20 and valve stem 21 connected with valve body 20. When intake valve 5 is in the full open position, valve body 20 is farthest away from valve seat 17 that is mounted to cylinder head 16 so as to be exposed to combustion chamber 3. When intake valve 5 is in the closed position, valve body 20 is closest to valve seat 17. Intake valve 5 also includes a valve drive including housing 18 made of a non-magnetic material and installed on cylinder head 16, shaft 19 axially moveably disposed within housing 18, and moveable element 22 mounted to shaft 19 for a unitary axial motion therewith. Shaft 19 is directly connected with valve stem 21 in this embodiment. Valve-opening spring 23 and valve-closing spring 24 are disposed on axially opposite sides of moveable element 22. Specifically, valve-opening spring 23 is disposed between an upper bottom of housing 18 and an upper surface of moveable element 22. Moveable element 22 is biased by valve-opening spring 23 in an opening direction in which valve body 20 is moved downward away from valve seat 17. Valve-closing spring 24 is disposed between a lower bottom of housing 18 and a lower surface of moveable element 22. Moveable element 22 is biased by valve-closing spring 24 in a closing direction in which valve body 20 is moved upward close to valve seat 17. Valve-opening spring 23 and valve-closing spring 24 cooperate to bias moveable element 22 in such a manner that intake valve 5 is held in the mid-open position between the closed position and the full open position, as shown in FIG. 3. Valve-opening electromagnet 25 is fixedly arranged within housing 18 so as to be spaced from the lower surface of moveable element 22. Valve-opening electromagnet 25 applies an electromagnetic attraction to moveable element 22 in the opening direction upon being energized. Valve-closing electromagnet 26 is fixedly arranged within housing 18 so as to be spaced from the upper surface of moveable element 22. Valve-closing electromagnet 26 applies an electromagnetic attraction to moveable element 22 in the closing direction upon being energized. When valve-opening electromagnet 25 and valve-closing electromagnet 26 are de-energized, intake valve 5 is held in the mid-open position by the biasing forces of springs 23 and 24. When valve-opening electromagnet 25 is energized, intake valve 5 is moved from the mid-open position toward the full open position against the biasing force of valve-closing spring 24 by the electromagnetic attraction applied to moveable element 22. On the other hand, when valve-closing electromagnet 26 is energized, intake valve 5 is moved from the mid-open position toward the closed position against the biasing force of valve-opening spring 23 by the electromagnetic attraction applied to moveable element 22.

Referring back to FIG. 1, the control system and method for implementing the first and second embodiments of the present invention is explained.

Figure 1:
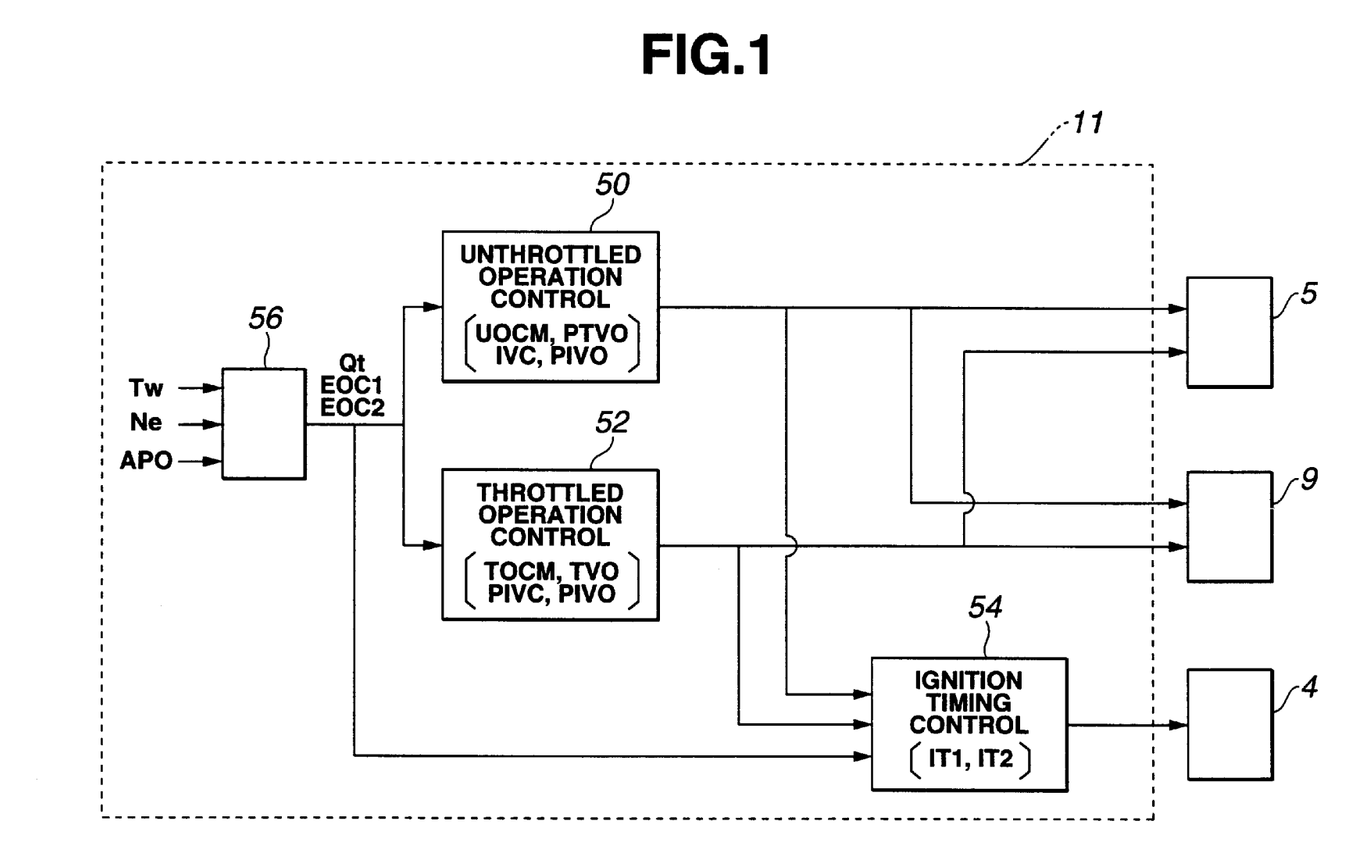
FIG. 1 illustrates a functional block diagram of a system and method for implementing first and second embodiments of the present invention.

As illustrated in FIG. 1, control unit 11 includes unthrottled operation control 50, throttled operation control 52 and ignition timing control 54 communicated with unthrottled operation and throttled operation controls 50 and 52. Unthrottled operation and throttled operation controls 50 and 52 are in communication with intake valve 5 and with throttle valve 9A through throttle actuator 9B shown in FIG. 2A. Ignition timing control 54 is in communication with spark plug 4A through ignition actuator 4B shown in FIG. 2A. Unthrottled operation control 50 and throttled operation control 52 perform a first intake control mode and a second intake control mode, respectively, depending on the engine operating conditions. Ignition timing control 54 determines first and second ignition timings IT1 and IT2 respectively used in the first and second intake control modes.

At block 56, a normal engine operating condition and a specific engine operating condition, in this embodiment an idle speed or cold operating condition, are determined based on the signals generated from the sensors. The idle speed operating condition may be determined based on accelerator position signal APO indicating that the accelerator is in the full closed position corresponding to ON state of the idle switch. The cold operating condition may be determined based on coolant temperature signal Tw indicating that the coolant temperature is not more than a predetermined value. Output EOC1 indicative of the normal engine operating condition and output EOC2 indicative of the specific engine operating condition are generated at block 56. .

Unthrottled operation control 50 is activated in response to output EOC1 to perform the first intake control mode. In the first intake control mode, an intake air amount is controlled by varying closing timing IVC of intake valve 5 based on target intake air amount Qt, fixing opening timing IVO of intake valve 5 to predetermined opening timing PIVO, and fixing throttle position TVO of throttle valve 9A to predetermined throttle position PTVO. Specifically, unthrottled operation control 50 determines variable closing timing IVC of intake valve 5 before bottom dead center (BDC) at an engine intake stroke based on target intake air amount Qt, fixes opening timing IVO of intake valve 5 to predetermined opening timing PIVO, namely, near top dead center (TDC) at the engine intake stroke, and fixes throttle position TVO of throttle valve 9A to predetermined throttle position PTVO, namely, a full open throttle position or a substantially full open throttle position where a slight negative pressure is produced within intake air pipe 7. Target intake air amount Qt is determined at block 56 in control unit 11, based on engine speed signal Ne generated from crank angle sensor 12 and accelerator position signal APO generated from accelerator sensor 13. As target intake air amount Qt increases, the closing timing of intake valve 5 is set closer to BDC. In the first intake control mode, engine 1 is in substantially unthrottled operation. Unthrottled operation control 50 generates mode output UOCM indicative of the first intake control mode and provides control output PTVO to throttle actuator 9B to operate throttle valve 9A at the fixed throttle position and control outputs IVC and PIVO to intake valve 5 for the operation at the varied closing timing and the fixed opening timing in the first intake control mode.

Throttled operation control 52 is activated in response to output EOC2 to perform the second intake control mode. In the second intake control mode, the intake air amount is controlled by varying throttle position TVO of throttle valve 9A based on target intake air amount Qt determined at block 56, and fixing closing and opening timings IVC and IVO of intake valve 5 to predetermined closing and opening timings PIVC and PIVO. Throttled operation control 52 determines variable throttle position TVO of throttle valve 9A based on target intake air amount Qt, fixes closing timing IVC of intake valve 5 to near BDC at the engine intake stroke as predetermined closing timing PIVC and fixes opening timing IVO thereof to near TDC at the engine intake stroke as predetermined opening timing PIVO. Throttled operation control 52 generates mode output TOCM indicative of the second intake control mode and provides control output TVO to throttle actuator 9B to operate throttle valve 9A at the varied throttle position and control outputs PIVC and PIVO to intake valve 5 for the operation at the fixed closing and opening timings in the second intake control mode.

Ignition timing control 54 is activated in response to mode output UOCM from unthrottled operation control 50 to determine first ignition timing IT1. Ignition timing control 54 is also activated in response to mode output TOCM from throttled operation control 52 to determine second ignition timing IT2 different from first ignition timing IT1. First and second ignition timings IT1 and IT2 are determined based on engine speed Ne and target intake air amount Qt, which are optimum ignition timings to be used in the first and second intake control modes, respectively. Ignition timing control 54 provides control outputs IT1 and IT2 for controlling spark plug 4A via ignition actuator 4B at first and second ignition timings IT1 and IT2 determined.

Control unit 11 also determines a fuel injection timing of fuel injector 10 and an amount of fuel to be injected through fuel injector 10 depending on the engine operating conditions. Basically, the fuel injection amount is determined so as to form an air-fuel mixture at a desired air-fuel ratio, based on intake air amount Qa that is measured by airflow meter 14.

It will be appreciated from the above description that control unit 11 and each of blocks 50 to 56 included therein would typically be implemented in software on a computer, but hardware and/or firmware implementations are also contemplated.

Figure 4:
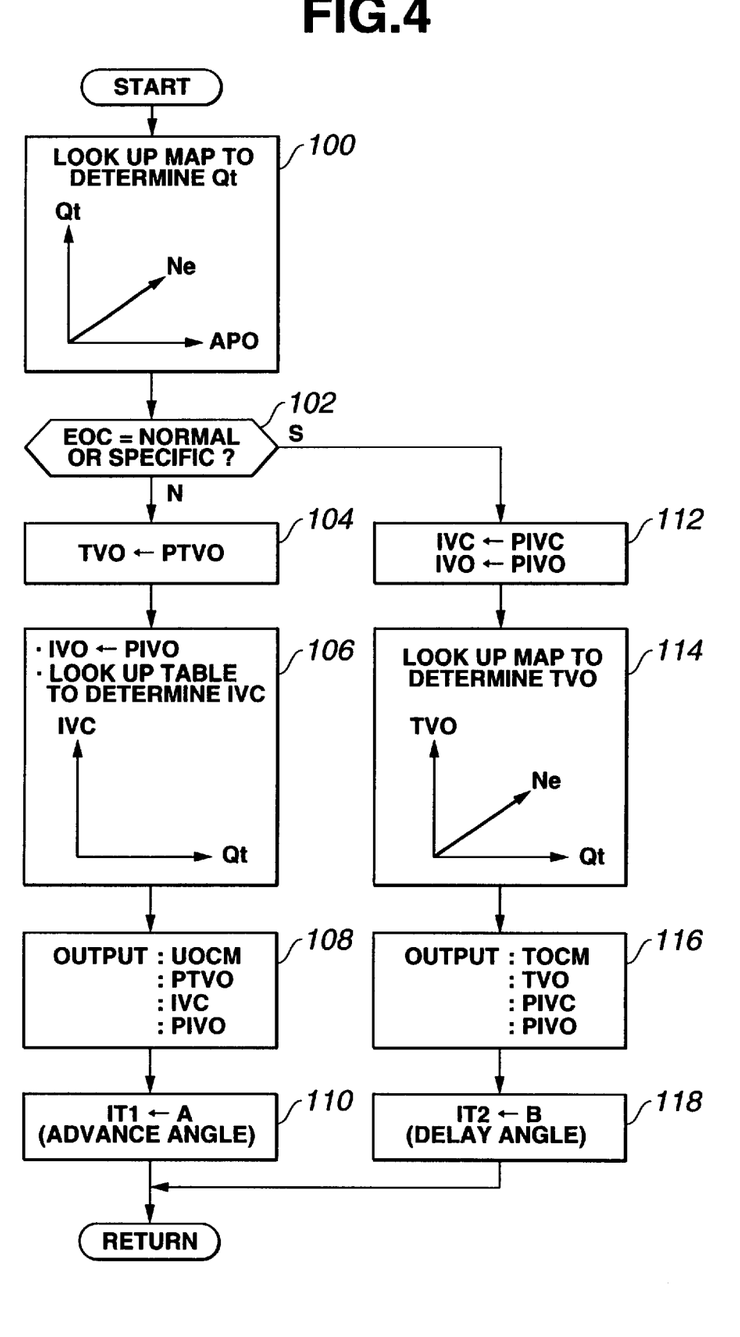
FIG. 4 is a flow diagram for implementing the first embodiment of the present invention.

Referring to FIG. 4A, a flow of the ignition timing control implemented in the first embodiment will be explained hereinafter.

Logic flow starts and goes to block 100 where target intake air amount Qt corresponding to a desired engine torque is determined by searching a look-up map showing target intake air amount Qt relative to accelerator position APO and engine speed Ne. At this time, if engine 1 is under the idle speed operation or the idle switch is ON, target intake air amount Qt may be corrected based on difference ΔNe between engine speed Ne and target idle speed Nidle.

Figure 6:
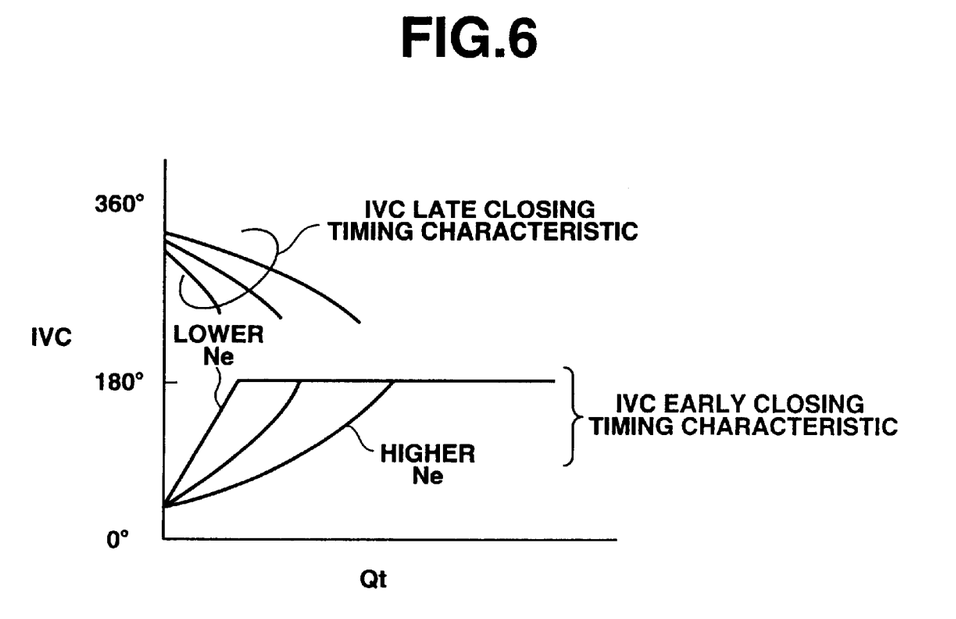
FIG. 6 is a map of intake valve closing timing characteristics.
Figure 7A:
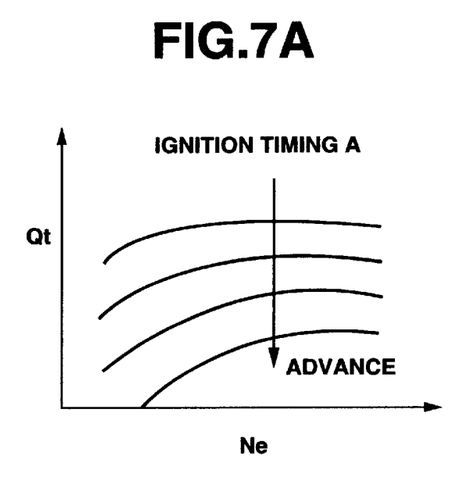
FIG. 7A is a map of ignition timing used in a first intake control mode.

Target intake air amount Qt is corrected to increase when difference ΔNe is a minus value, while target intake air amount Qt is corrected to decrease when difference ΔNe is a plus value. At decision block 102, an interrogation is made whether the engine operating condition is a specific operating condition or a normal operating condition other than the specific operating condition. In this embodiment, the specific operating condition is an idle speed operating condition or cold operating condition. If it is determined at decision block 102 that engine 1 is under the normal operating condition, it is decided to perform the first intake control mode and the logic goes to block 104. At block 104, throttle position TVO of throttle valve 9A is fixed to predetermined throttle position PTVO that is the full open position or substantially the full open position in which a slight negative pressure is produced. The logic then goes to block 106, at which closing timing IVC of intake valve 5 is determined by searching a look-up table showing closing timing IVC of intake valve 5 relative to target intake air amount Qt, while opening timing IVO of intake valve 5 is fixed to predetermined opening timing PIVO that is near TDC at the engine intake stroke. As target intake air amount Qt becomes larger, closing timing IVC is set closer to BDC at the engine intake stroke. As target intake air amount Qt becomes smaller, closing timing IVC is set closer to TDC at the engine intake stroke. Meanwhile, the characteristics of early closing timing control in which the intake valve closure occurs prior to BDC, and late closing timing control in which the intake valve closure occurs subsequent to BDC, are indicated at IVC late closing timing and IVC early closing timing in FIG. 6. At block 108, mode output UOCM indicating that the first intake control mode is used, is generated, and control output PTVO indicative of the fixed throttle position is provided for operating throttle valve 9A at the fixed throttle position, control output IVC indicative of the determined closing timing and control output PIVO indicative of the fixed opening timing are provided for operating intake valve 5 at the determined closing timing and the fixed opening timing. The operations at blocks 104 through 108 are carried out by unthrottled operation control 50. The logic goes to block 110, at which ignition timing IT1 to be used in the first intake control mode is determined by being set at ignition timing A on an advance angle side relative to the ignition timing used in the intake control conducted by varying throttle position TVO of throttle valve 9A. The determination of advanced ignition timing A is conducted in order to prevent combustion speed of an air-fuel mixture within an engine cylinder from being reduced in the first intake control mode. The reduction in combustion speed results from the events, such as attenuation of a gas flow within the engine cylinder and decrease in temperature of the air-fuel mixture within the engine cylinder, which are caused by the early closure of intake valve 5 as discussed above. Advanced ignition timing A is determined by searching a look-up map, shown in FIG. 7A, based on engine speed Ne and target intake air amount Qt as load. As target intake air amount Qt becomes lower, advanced ignition timing A is advanced. Namely, as the combustion speed of the air-fuel mixture within the engine cylinder decreases, advanced ignition timing A is advanced.

Figure 7B:
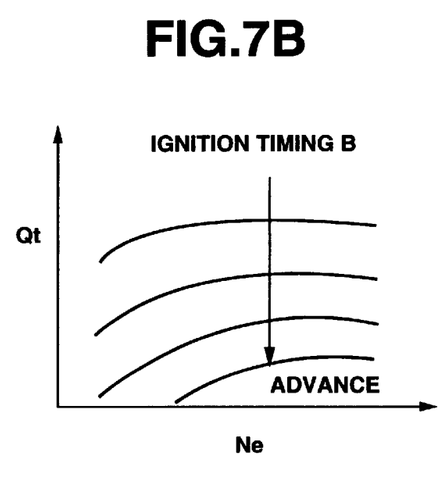
FIG. 7B is a map of ignition timing used in a second intake control mode.

If it is determined at decision block 102 that engine 1 is under the specific operating condition, it is decided to perform the second intake control mode and the logic goes to block 112. At block 112, closing timing IVC of intake valve 5 is fixed to predetermined closing timing PIVC, namely, near BDC at the engine intake stroke, and opening timing IVO of intake valve 5 is fixed to predetermined opening timing PIVO, namely, near TDC at the engine intake stroke. The logic then goes to block 114, at which throttle position TVO of throttle valve 9A is determined by searching a look-up map showing throttle position TVO relative to target intake air amount Qt and engine speed Ne. Throttle position TVO is set in proportion to ratio Qt/Ne of target intake air amount Qt to engine speed Ne. At block 116, mode output TOCM indicating that the second intake control mode is used is generated. Also, at block 116, control output TVO indicative of the determined throttle position is provided for operating throttle valve 9A at the determined throttle position and control outputs PIVC and PIVO indicative of the fixed closing and opening timings are provided for operating intake valve 5 at the fixed closing and opening timings. The operations at blocks 112 through 116 are carried out by throttled operation control 52. The logic goes to block 118, at which ignition timing IT2 to be used in the second intake control mode is determined by being set at ignition timing B on a delay angle side relative to the ignition timing used in the intake control conducted by varying closing timing IVC of intake valve 5. The reason of the determination of delayed ignition timing B is that the reduction in combustion speed of the air-fuel mixture within the engine cylinder does not occur during the intake control conducted by varying throttle position TVO of throttle valve 9A. Delayed ignition timing B is determined by searching a look-up map, shown in FIG. 7B, based on engine speed Ne and target intake air amount Qt as load. Specifically, ignition timings A and B are finally determined by making various corrections, for instance, knock correction for an engine cylinder knock event. The operations at blocks 110 and 118 are carried out by ignition timing control 54.

Next, the second embodiment of the present invention is explained, in which either one of the first and second ignition timings IT1 and IT2 is used as a base ignition timing and the other of the ignition timings IT1 and IT2 is determined by providing a correction amount to the base ignition timing.

Figure 5:
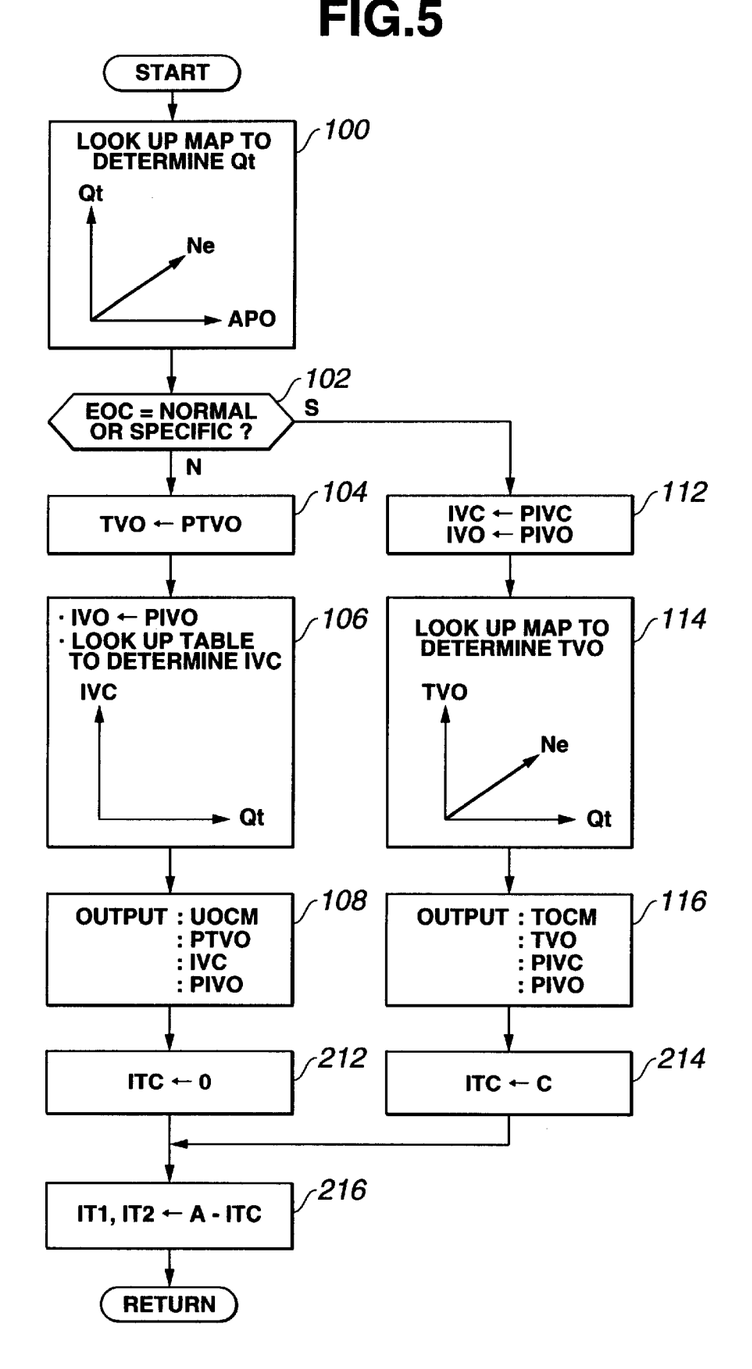
FIG. 5 is a flow diagram for implementing the second embodiment of the present invention.

FIG. 5 illustrates a flow of the ignition timing control implemented in the second embodiment. The operations carried out at blocks 100 to 108 and 112 to 116 are the same as those shown in FIG. 4 in the first embodiment, and therefore detailed explanations therefor are omitted.

At block 212, advanced ignition timing A is used as a base ignition timing and correction amount ITC is set at zero. The logic then goes to block 216, at which ignition timing IT1 to be used in the first intake control mode is determined by subtracting zero as correction amount ITC from advanced ignition timing A as the base ignition timing. As a result, ignition timing IT1 is obtained as advanced ignition timing A. Advanced ignition timing A is determined by the same reason and by searching the same look-up map as explained in the first embodiment.

Figure 8:
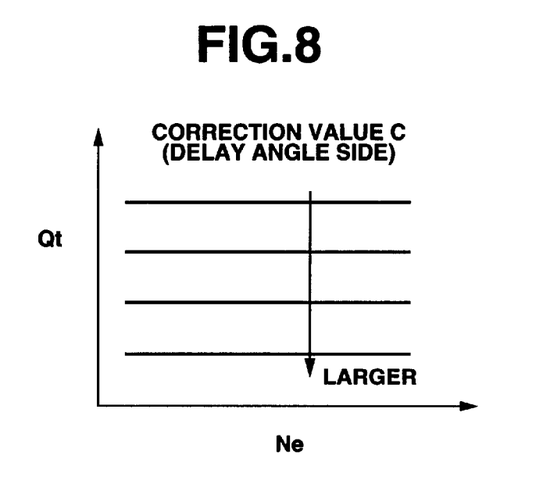
FIG. 8 is a map of correction value for the ignition timing.

At block 214, advanced ignition timing A is used as the base ignition timing and correction amount ITC is set at value C located on the delay angle side. Value C is determined by searching a look-up map, shown in FIG. 8, based on engine speed Ne and target intake air amount Qt as load. As target intake air amount Qt becomes smaller, or in other words, as the combustion speed of the air-fuel mixture within the engine cylinder decreases, value C as correction amount ITC becomes larger. If advanced ignition timing A is further advanced, value C will be set to a larger value. The logic goes to block 216, at which ignition timing IT2 to be used in the second intake control mode is determined by subtracting value C as correction amount ITC from advanced ignition timing A as the base ignition timing. Ignition timing IT2 is thus set on the delay angle side. The reason of delayed ignition timing IT2 is the same as explained about delayed ignition timing B in the first embodiment. The operations at blocks 208, 214 and 216 are carried out by ignition timing control 54.

Variably operated intake valve is not limited to electromagnetically operated intake valve 5 used in the first and second embodiments and it may be of hydraulically operated type.

This application is based on Japanese Patent Application No. 11-342501, filed on Dec. 1, 1999, the entire contents of which, inclusive of the specification, claims and drawings, are hereby incorporated by reference herein.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A system for controlling ignition timing in an engine, the system comprising:
    an intake valve operative at variable opening and closing timing to regulate an amount of intake air passing therethrough;
    a throttle valve operative to variably move between throttle positions to regulate an amount of intake air passing therethrough;
    an unthrottled operation control in communication with the intake valve and the throttle valve, the unthrottled operation control performing a first intake control mode in which an intake air amount is controlled by varying the closing timing of the intake valve, and generating a first mode output indicative of the first intake control mode and providing a control output indicative of the varied closing timing to the intake valve;
    a throttled operation control in communication with the intake valve and the throttle valve, the throttled operation control performing a second intake control mode in which the intake air amount is controlled by varying the throttle position of the throttle valve, and generating a second mode output indicative of the second intake control mode and providing a control output indicative of the varied throttle position to the throttle valve; and
    an ignition timing control in communication with the unthrottled operation and throttled operation controls, the ignition timing control being operative to determine a first ignition timing in response to the first mode output at an engine operating condition and determine a second ignition timing different from the first ignition timing in response to the second mode output at the same engine operating condition.

2. A system as claimed in claim 1, wherein the first ignition timing is set on an advance angle side relative to the second ignition timing.

3. A system as claimed in claim 1, wherein the either one of the first and second ignition timings is determined as a base ignition timing and the other of the first and second ignition timings is determined by providing a correction amount to the base ignition timing.

4. A system as claimed in claim 1, wherein the unthrottled operation control is activated in a normal engine operating condition.

5. A system as claimed in claim 1, wherein the throttled operation control is activated in an idle speed or cold operating condition.

6. A system as claimed in claim 1, wherein the closing timing of the intake valve is determined based on a target intake air amount in the first intake control mode, the closing timing of the intake valve being varied before bottom dead center (BDC) at an engine intake stroke, the closing timing of the intake valve being closer to BDC as the target intake air amount increases.

7. A system as claimed in claim 6, wherein the unthrottled operation control sets the opening timing of the intake valve to near top dead center at the engine intake stroke.

8. A system as claimed in claim 1, wherein the unthrottled operation control sets the throttle position of the throttle valve to a predetermined throttle position which is a full open throttle position or a substantially full open throttle position.

9. A system as claimed in claim 1, wherein the first ignition timing is determined based on a load.

10. A system as claimed in claim 9, wherein as the load becomes smaller, the first ignition timing is advanced.

11. A system as claimed in claim 9, wherein the first ignition timing is determined based on an engine speed.

12. A system as claimed in claim 11, wherein as the engine speed becomes lower, the first ignition timing is advanced.

13. A system as claimed in claim 1, wherein the closing timing of the intake valve is set at a predetermined closing timing which is at near bottom dead center at an engine intake stroke in the second intake control mode.

14. A system as claimed in claim 1, wherein the throttle position is varied based on a target intake air amount and an engine speed in the second intake control mode.

15. A system as claimed in claim 1, wherein the intake valve is an electromagnetically operated intake valve comprising a valve body and a valve drive actuating the valve body, the valve drive including a moveable element, springs arranged on opposite sides of the moveable element, and two electromagnets spaced from opposed surfaces of the moveable element, the electromagnets attracting the moveable element against spring forces of the springs upon being energized, respectively.

16. A method of controlling ignition timing in an engine having a variably operated intake valve cooperating with a variably operated throttle valve, the method comprising:
    determining an engine operating condition;
    depending on the engine operating condition determined, selecting one of an unthrottled operation control in which an intake air amount is controlled by varying a closing timing of the intake valve, and a throttled operation control in which the intake air amount is controlled by varying the throttle position of the throttle valve; and
    determining an ignition timing to be used in the selected one of the unthrottled operation and throttled operation controls, the ignition timing comprising first and second ignition timings, for the unthrottled operation control and the throttled operation control, respectively, that are different from each other for a same engine operating condition.

17. A method as claimed in claim 16, wherein the determining the ignition timing comprises setting the first ignition timing on an advance angle side relative to the second ignition timing.

18. A method as claimed in claim 16, wherein the determining the ignition timing comprises using either one of the first and second ignition timings as a base ignition timing and providing a correction amount to the base ignition timing to determine the other of the first and second ignition timings.

19. A method as claimed in claim 16, wherein the unthrottled operation control is conducted in a normal engine operating condition.

20. A method as claimed in claim 16, wherein the throttled operation control is conducted in an idle speed or cold operating condition.

21. A method as claimed in claim 16, further comprising determining a target intake air amount used in varying the closing timing of the intake valve and the throttle position of the throttle valve.

22. A method as claimed in claim 21, wherein the closing timing of the intake valve is varied before bottom dead center (BDC) at an engine intake stroke in the unthrottled operation control, the closing timing of the intake valve being closer to BDC as the target intake air amount increases.

23. A method as claimed in claim 22, wherein the opening timing of the intake valve is fixed to near top dead center at the engine intake stroke.

24. A method as claimed in claim 16, wherein the throttle position of the throttle valve is set at a full open throttle position or a substantially full open throttle position in the unthrottled operation control.

25. A method as claimed in claim 17, wherein the first ignition timing is determined based on a load.

26. A method as claimed in claim 25, wherein as the load becomes smaller, the first ignition timing is advanced.

27. A method as claimed in claim 25, wherein the first ignition timing is determined based on an engine speed.

28. A method as claimed in claim 27, wherein as the engine speed becomes lower, the first ignition timing is advanced.

29. A method as claimed in claim 20, wherein the predetermined closing timing of the intake valve is set at near bottom dead center at an engine intake stroke in the throttle operation control.

30. A method as claimed in claim 16, further comprising monitoring a parameter used in determining the engine operating condition.

31. A method as claimed in claim 30, wherein the parameter comprises an engine coolant temperature.

32. A method as claimed in claim 21, further comprising monitoring a parameter used in determining the target intake air amount.

33. A method as claimed in claim 32, wherein the parameter comprises an engine speed and an accelerator position corresponding to an opening degree of an accelerator.

34. A method as claimed in claim 33, wherein the throttle position is varied based on the target intake air amount and the engine speed in the throttled operation control.

35. A computer readable storage device having stored therein data representing instructions executable by a computer to control an engine having a variably operated intake valve cooperating with a variably operated throttle valve, the computer readable storage device comprising:
    instructions for determining an engine operating condition;
    instructions for, depending on the engine operating condition determined, selecting one of an unthrottled operation control in which an intake air amount is controlled by fixing a throttle position of the throttle valve to a predetermined throttle position and varying a closing timing of the intake valve, and a throttled operation control in which the intake air amount is controlled by fixing the closing timing of the intake valve to a predetermined closing timing and varying the throttle position of the throttle valve; and
    instructions for determining an ignition timing to be used in the selected one of the unthrottled operation and throttled operation controls, the ignition timing comprising first and second ignition timings, for the unthrottled operation control and the throttled operation control, respectively, that are different from each other for a same engine operating condition.

36. A computer readable storage medium as claimed in claim 35, wherein the instructions for determining the ignition timing comprise instructions for setting the first ignition timing on an advance angle side relative to the second ignition timing.

37. A computer readable storage medium as claimed in claim 35, wherein the instructions for determining the ignition timing comprise instructions for using either one of the first and second ignition timings as a base ignition timing and providing a correction amount to the base ignition timing to determine the other of the first and second ignition timings.

38. A computer readable storage medium as claimed in claim 35, wherein the instructions for determining the engine operating condition comprise instructions for determining a normal engine operating condition.

39. A computer readable storage medium as claimed in claim 35, wherein the instructions for determining the engine operating condition comprise instructions for determining an idle speed or cold operating condition.

40. A computer readable storage medium as claimed in claim 35, further comprising instructions for determining a target intake air amount used in varying the closing timing of the intake valve and the throttle position of the throttle valve.

41. A computer readable storage medium as claimed in claim 40, wherein the instructions for selectively conducting one of an unthrottled operation control and a throttled operation control comprise instructions for varying the closing timing of the intake valve before bottom dead center (BDC) at an engine intake stroke in the unthrottled operation control, the closing timing of the intake valve being closer to BDC as the target intake air amount increases.

42. A computer readable storage medium as claimed in claim 41, wherein the instructions for selectively conducting one of an unthrottled operation control and a throttled operation control comprise instructions for fixing the opening timing of the intake valve to near top dead center at the engine intake stroke.

43. A computer readable storage medium as claimed in claim 35, wherein the instructions for selectively conducting one of an unthrottled operation control and a throttled operation control comprise instructions for setting the predetermined throttle position at a full open throttle position or a substantially full open throttle position in the unthrottled operation control.

44. A computer readable storage medium as claimed in claim 38, wherein the instructions for determining an ignition timing comprise instructions for determining the first ignition timing based on a load.

45. A computer readable storage medium as claimed in claim 44, wherein as the load becomes smaller, the first ignition timing is advanced.

46. A computer readable storage medium as claimed in claim 44, wherein the instructions for determining an ignition timing comprise instructions for determining the first ignition timing based on an engine speed.

47. A computer readable storage medium as claimed in claim 46, wherein as the engine speed becomes lower, the first ignition timing is advanced.

48. A computer readable storage medium as claimed in claim 39, wherein the instructions for selectively conducting one of an unthrottled operation control and a throttled operation control comprise instructions for setting the predetermined closing timing of the intake valve at near bottom dead center at an engine intake stroke in the throttle operation control.

49. A computer readable storage medium as claimed in claim 35, further comprising instructions for monitoring a parameter used in determining the engine operating condition.

50. A computer readable storage medium as claimed in claim 49, wherein the parameter comprises an engine coolant temperature.

51. A computer readable storage medium as claimed in claim 40, further comprising instructions for monitoring a parameter used in determining the target intake air amount.

52. A computer readable storage medium as claimed in claim 51, wherein the parameter comprises an engine speed and an accelerator position corresponding to an opening degree of an accelerator.

53. A computer readable storage medium as claimed in claim 52, wherein the instructions for selectively conducting one of an unthrottled operation control and a throttled operation control comprise instructions for varying the throttle position based on the target intake air amount and the engine speed in the throttled operation control.

54. A system as claimed in claim 1, wherein the closing timing of the intake valve is determined based on a target intake air amount in the first intake control mode, the closing timing of the intake valve being varied after bottom dead center (BDC) at an engine intake stroke, the closing timing of the intake valve being farther from BDC as the target intake air amount increases.

55. An intake air control apparatus for an engine, comprising:
   a throttle valve installed in an intake air passage;
   an intake valve incorporated with a combustion chamber, the intake valve being operative at variable open/close timing;
   a spark plug mounted to the combustion chamber; and
   a control unit configured to:
      provide a first mode in which an intake air amount is regulated by controlling an open/close timing of the intake valve,
      provide a second mode in which the intake air amount is regulated by controlling a position of the throttle valve, and
      determine an ignition timing of the spark plug in accordance with the provided mode, wherein the ignition timing for the first mode being set different from the ignition timing for the second mode at a same engine operating condition.

56. An intake air control apparatus as claimed in claim 55, wherein the ignition timing for the first mode is set on an advance side relative to the ignition timing for the second mode.

57. An intake air control apparatus as claimed in claim 56, wherein the ignition timing for either one of the first mode and second mode is provided as a base ignition timing, and the other ignition timing of the first mode and second mode is determined by providing a correction amount to the base ignition timing.

58. An intake air control apparatus as claimed in claim 56, wherein the second mode is provided in an idle speed operating condition.

59. An intake air control apparatus as claimed in claim 56, wherein the second mode is provided in a cold operating condition.

60. An intake air control apparatus as claimed in claim 56, wherein the close timing of the intake valve in the first mode is set earlier than a bottom dead center of an intake stroke, and wherein the close timing of the intake valve is controlled near the bottom dead center of the intake stroke as a target intake air amount increases.

61. An intake air control apparatus as claimed in claim 60, wherein the open timing of the intake valve in the first mode is set near a top dead center of the intake stroke.

62. An intake air control apparatus as claimed in claim 56, wherein the position of the throttle valve in the first mode is set at a full open position or a substantially full open position.

63. An intake air control apparatus as claimed in claim 56, wherein the close timing of the intake valve in the second mode is set near a bottom dead center of an intake stroke.

64. An intake air control apparatus as claimed in claim 56, wherein the position of the throttle valve in the second mode is varied based on a target intake air amount and an engine speed.

65. An intake air control apparatus as claimed in claim 56, wherein the intake valve is electromagnetically operated.

66. An intake air control apparatus as claimed in claim 56, wherein the intake valve is operated by a structure including an armature aligned with the intake valve, a pair of springs biasing the armature, and a pair of electromagnets attracting the armature to open and close the intake valve.

67. An intake air control apparatus as claimed in claim 56, wherein the ignition timing for the first mode is advanced as an engine load becomes smaller.

68. An intake air control apparatus as claimed in claim 56, wherein the ignition timing for the first mode is provided as a base ignition timing, and the ignition timing for the second mode is determined by providing a correction amount to the base ignition timing.

69. An intake air control apparatus as claimed in claim 67, wherein the ignition timing for the first mode is provided as a base ignition timing, and the ignition timing for the second mode is determined by providing a correction amount to the base ignition timing, the correction amount becomes larger as the engine load becomes smaller.

* * * * *